United States Patent
Silberberg

[11] Patent Number: 5,828,459
[45] Date of Patent: Oct. 27, 1998

[54] APPARATUS AND METHOD FOR SCANNING LASER MICROSCOPY

[75] Inventor: Yaron Silberberg, Rehovot, Israel

[73] Assignee: Yeda Research and Development Co. Ltd., Rehovot, Israel

[21] Appl. No.: 847,853

[22] Filed: Apr. 28, 1997

[30] Foreign Application Priority Data

May 3, 1996 [IL] Israel ......................................... 118130

[51] Int. Cl.$^6$ .................................................. G01N 21/00
[52] U.S. Cl. .............................. 356/444; 356/445; 356/5; 356/10
[58] Field of Search ................................... 356/444, 445, 356/320, 349, 369, 5, 10

[56] References Cited

U.S. PATENT DOCUMENTS 4,856,893 8/1989 Breen .......................................... 356/5

FOREIGN PATENT DOCUMENTS 05-149825 6/1993 Japan .
08-062133 3/1996 Japan .

Primary Examiner—Frank G. Font
Assistant Examiner—Reginald A. Ratiff
Attorney, Agent, or Firm—Darby & Darby

[57] ABSTRACT

A method for determining the fine structure of materials by means of a nonlinear scanning laser microscope, including the steps of forming an image of a specimen by scanning selected points thereof with a focusable laser beam of a predetermined fundamental frequency w, thereby exciting the points to generate signals constituting the third harmonic 3w of said fundamental frequency w, collecting the signals by collecting means, substantially filtering out from the collected 3w signals, signals of a frequency other than the third harmonic 3w, feeding the filtered 3w signals to a detector, and storing the output of the detector for processing and display. A nonlinear scanning laser microscope adapted to form an image of a specimen by scanning it point by point with a focusable laser beam of a predetermined fundamental frequency, is also provided.

8 Claims, 4 Drawing Sheets

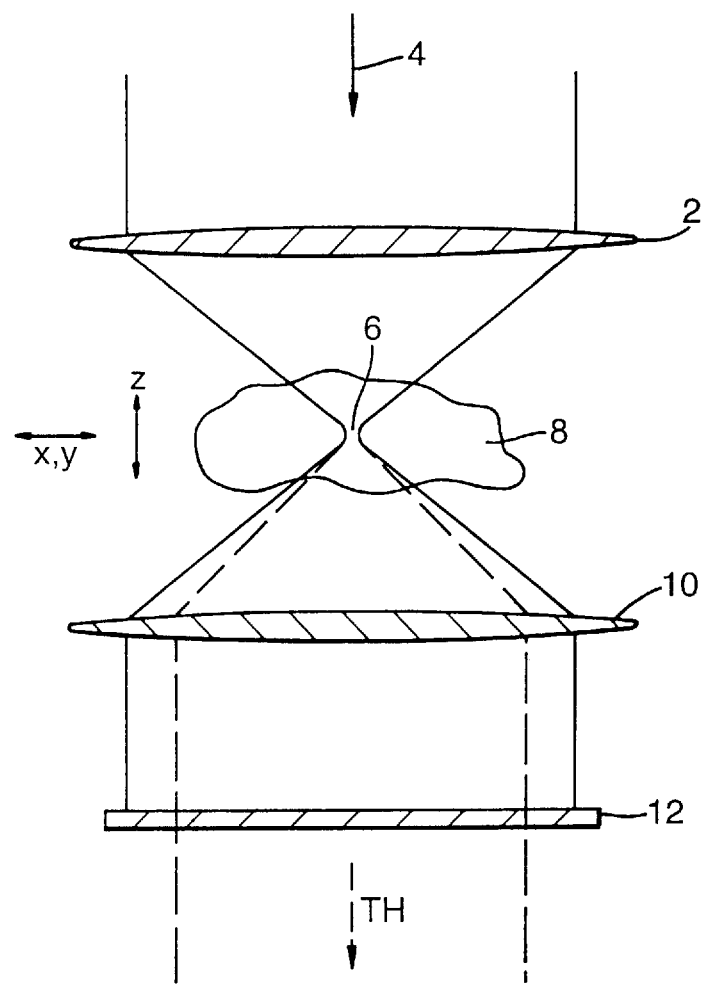

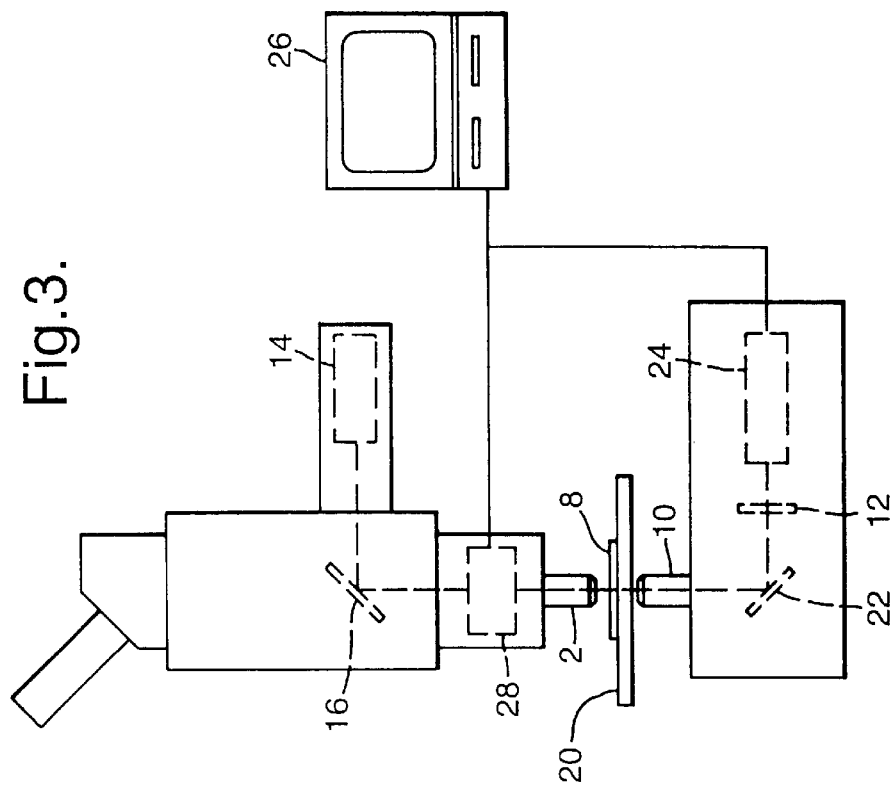
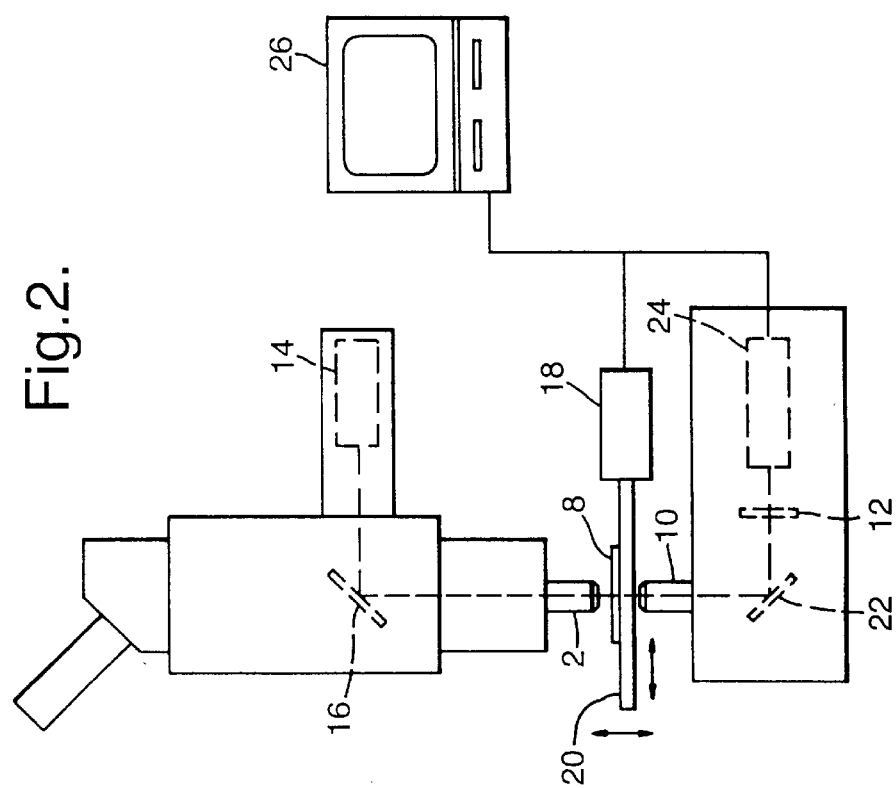

APPARATUS AND METHOD FOR SCANNING LASER MICROSCOPY

BACKGROUND OF THE INVENTION

The present invention relates to optical microscopy, more specifically to a method and an apparatus for determining the fine structure of materials with the aid of scanning laser microscopy.

Various forms of scanning laser microscopy, such as confocal microscopy, are increasingly used in modern optical microscopy. Among their many advantages are enhanced depth sensitivity that permits obtaining cross-sectional views of the specimen, as well as digital image collection that facilitates various forms of digital image processing.

A classical problem of optical microscopy, however, is the observation and investigation of transparent objects or specimens. Some ingenious techniques have been developed to obtain phase information from such specimens, such as phase contrast microscopy, in which non-observable phase differences in the light passing a specimen are converted into observable amplitude differences, or differential interference which gives similar results.

These methods are, however, based on the linear index of refraction n of the medium that, for optical glasses for instance, differs by a factor of 2 at most, which is altogether too narrow a range to resolve fine differences between inhomogeneities in a transparent medium, close interfaces and thin layers embedded in other media, with only minute differences in their respective linear refractive indices n.

Trying to overcome these difficulties, a scanning optical microscope has been developed that operates by second-harmonic imaging. While this microscope is claimed to have achieved contrast levels and resolution of details superior to those obtainable by conventional microscopy, the second-harmonics microscope is limited to the observation of materials which have a non-centro-symmetric structure and, therefore, to certain crystalline materials and other specially structured matter only.

SUMMARY OF THE INVENTION

It is therefore one of the objects of the invention to overcome the drawbacks and restrictions of the above-described art and to provide a scanning laser microscope that is capable of producing high-resolution images of specimens of any type of material.

According to the invention, this object is achieved by providing a method for determining the fine structure of materials by means of a nonlinear scanning laser microscope, comprising the steps of forming an image of a specimen by scanning selected points thereof with a focusable laser beam of a predetermined fundamental frequency w, thereby exciting said points to generate signals constituting the third harmonic 3w of said fundamental frequency w; collecting said signals by collecting means; substantially filtering out from said collected 3w signals, signals of a frequency other than said third harmonic 3w feeding said filtered 3w signals to a detector, and storing the output of said detector for processing and display.

The invention further provides a nonlinear scanning laser microscope adapted to form an image of a specimen by scanning it point by point with a focusable laser beam of a predetermined fundamental frequency, thereby exciting said points to generate signals constituting a harmonic of said fundamental frequency, which signals are stored in storage means for purpose of processing and display, characterised in that said harmonic of said fundamental frequency is the third harmonic thereof.

In a high-intensity light field of frequency w, all materials generate some third harmonic light at 3w, the amount of which depends on the third power of the incident light, and on the nonlinear material coefficient $X^{(3)}$. It also depends on the phase matching condition, i.e., on the relation of phase velocities of the fundamental and the harmonic wave. It is known that even with perfect phase matching, a tightly focused beam in a homogeneous medium does not produce any third harmonic generation because of the geometry of the interaction, yet it was found that significant third harmonic signals can be generated in inhomogeneous media, close interfaces and in thin layers of materials embedded in other media. These signals are generated even when the layers are very close in refractive index, as described below. A scanning laser microscope which measures the third harmonic generation light will detect interfaces and small objects which differ in their third harmonic generation coefficient from the surrounding medium.

The third harmonic generation of transparent material (i.e., far from optical resonances) varies widely. For example, for various optical glasses, $X^{(3)}$ could differ by a factor of 100, while, as mentioned above, their refractive indices n vary by about a factor of 2 only. An approximate theory for gases predicts that $X^{(3)}=(n^2-1)^4$, and the power of the third harmonic light is proportional to $[X^{(3)}]^2=(n^2-1)^8$, which means that small index differences translate into large third harmonic generation efficiencies. Third harmonic generation should therefore be efficient at detecting differences between materials. In addition, because of the nonlinearity involved, such a microscope probes a volume which is smaller than its actual depth of field, and will therefore exhibit superior spatial resolution, both in depth and in transverse directions.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE DRAWINGS

In the drawings:

FIG. 1 illustrates the principle of operation of a third harmonic microscope;

FIG. 2 is a schematic representation of a first embodiment of a nonlinear scanning microscope;

FIG. 3 is a schematic representation of a second embodiment of a nonlinear scanning microscope;

DESCRIPTION OF THE PREFERRED EMBODIMENTS

Figure 4:
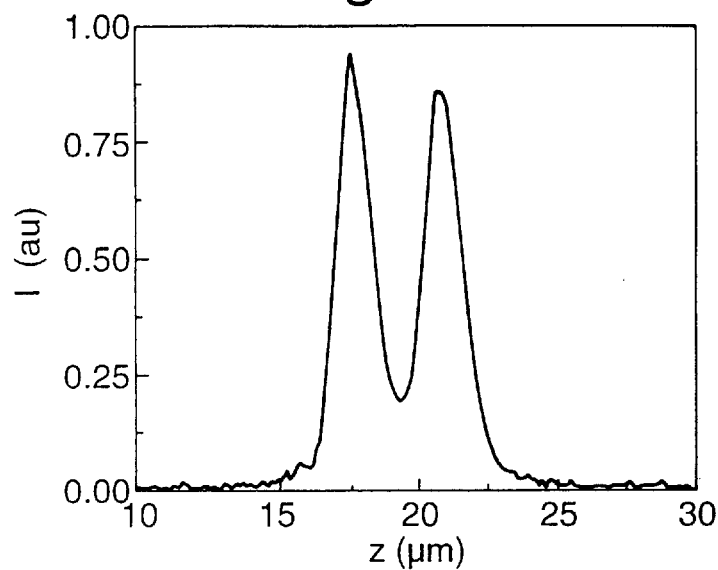
FIG. 4 shows the third harmonic generation intensity and resolution during z-axis scanning of a 15 μm thick water film between two glass plates, with the focal point of the objective at the interface.

Referring now to the drawings, there is seen in FIG. 1 a schematic explaining the operation principle of the third harmonic microscope: The microscope objective 2 focuses a short-pulse, high-intensity laser beam 4 at a fundamental frequency w into a small spot 6 inside a specimen 8, producing there a third harmonic wave TH at a frequency 3w. The third harmonic wave is collected by a collector lens 10 and passes through a filter 12, filtering out any traces of the original beam at the fundamental frequency w, to be eventually detected. Specimen 8 is scanned either by moving it in the x and/or y and/or z direction (i.e., along a line, and/or across a plane and/or throughout a volume), or by scanning the laser beam. The third harmonic signals from all scanned points are collected electronically to produce the image.

FIG. 2 is a schematic representation of a first embodiment of a nonlinear scanning laser microscope. Seen is a high-intensity laser source 14 which has to be of the short-pulse type so that the necessary peak power can be obtained without reaching average power levels that would damage the specimen. Most suitable are laser sources at the near infrared range (between 1 and 2 μm), so that the third harmonic generation light would be in or near the visible region. Such a source could be a CW mode-locked laser with pulses in the subpicosecond range, which produces 10–100 mw of average power.

Further seen in FIG. 2 is a dichroic beam splitter 16 which reflects the laser beam into the microscope axis, but transmits visible light for visual inspection of the specimen.

Further along the optical axis of the microscope is seen a standard, high-power microscope objective 2 (see also FIG. 1) by means of which the light from laser 14 is focused into specimen 8, producing the third harmonic light.

In this embodiment, the scanning motion is derived from a scanning mechanism 18 which moves the microscope stage 20 in predetermined steps and directions.

The modified light, having been collected by collector lens 10 via a deflecting mirror 22, now reaches filter 12 where all background light of the fundamental frequency w is filtered out, transmitting only the pure third harmonic signal which is received by a detector 24, e.g., a photomultiplier. The electronically produced image is displayed on the screen of computer 26.

In the variant shown in FIG. 3, scanning is effected by the laser beam itself, with the aid of a per se known scanning arrangement 28. It is also possible to combine the scanning mechanism 18 of FIG. 2 with scanning arrangement 28.

FIGS. 4 to 7 illustrate the results of tests run with the scanning microscope shown in FIG. 2. A thin film of either water (FIGS. 4 to 6) or oil (FIG. 7) enclosed between two glass plates served as specimen.

The setup included a short-pulse laser emitting at 1.55 μm (Spectra-Physics OPAL) and the beam was focused into the specimen using a Zeiss Plan-Achromat objective x100 (N.A. 1.4). The specimen was scanned along the optical axis (z-axis) in 0.1 μm steps with the aid of a computer-controlled motorized stage. The third harmonic light had a wavelength of 0.516 μm.

Figure 5:
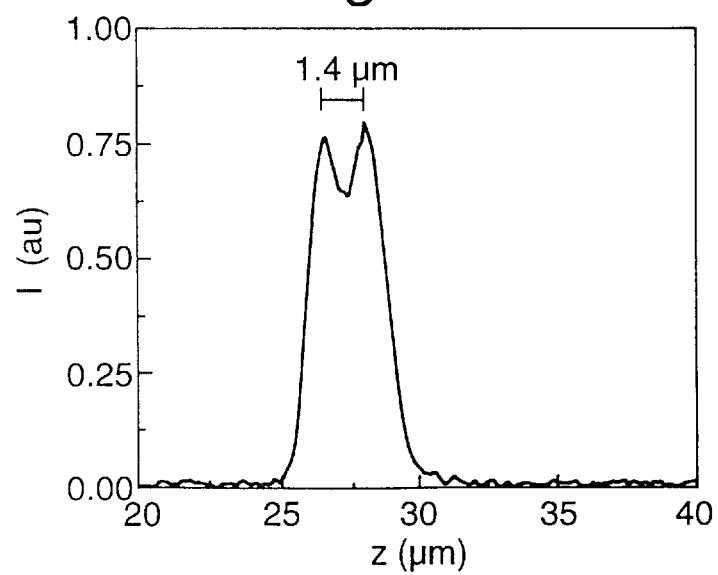
FIG. 5 shows a similar specimen with a water film approximately 1.5 μm thick.
Figure 6:
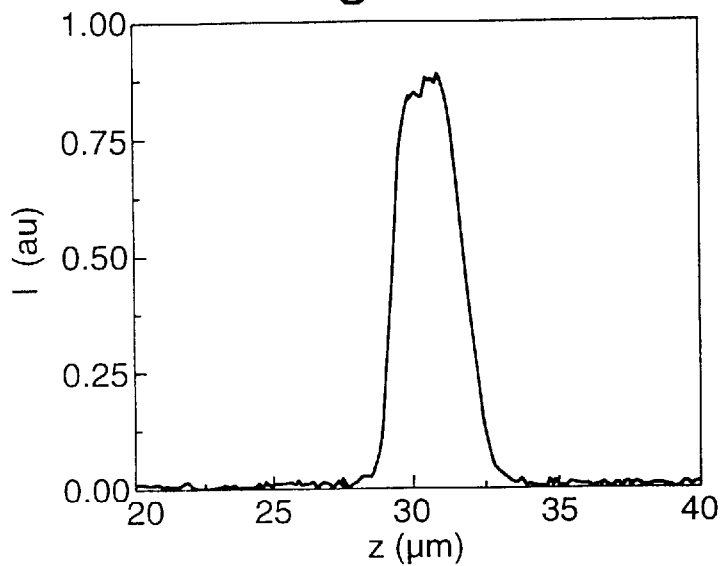
FIG. 6 represents the scanning results for a specimen with a water film of a thickness of approximately 1 μm.

FIGS. 4 to 6 show third harmonic intensity (in arbitrary units) for a water film as the specimen is moved through the focal point of the objective. Strong third harmonic generation can be observed at the two interfaces glass-water-glass. The third harmonic generation signal peaks when the focal point is at the interface, and decreases to half its peak value when the specimen is moved by about 1 μm. The two interfaces can still be resolved when the film is about 1.5 μm thick, as seen in FIG. 5; below this value, the interfaces can no longer be resolved, but a strong third harmonic generation signal still identifies the location of the film, as in FIG. 6. This result confirms that small (submicron) objects can be detected through the third harmonic generation they generate when embedded in a uniform matrix.

Figure 7:
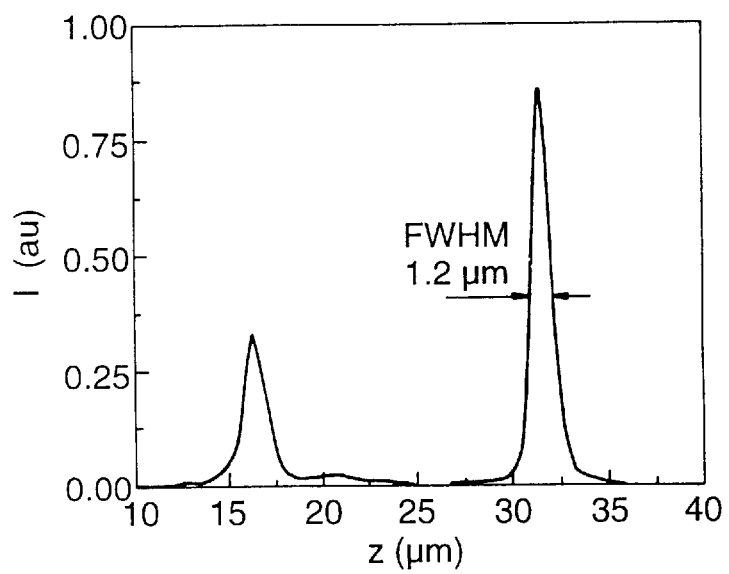
FIG. 7 shows the scanning results of a 15 μm thick oil film between two glass plates.

FIG. 7 shows a similar result for a 15 μm thick oil film. The oil is immersion oil (n=1.516) as used in microscopy, and is index-matched with respect to the glass walls of the cell. Yet, as can be seen, strong third harmonic signals are generated at both glass-oil interfaces.

It is thus seen that the third harmonic generation differentiates between materials, even if their linear properties (refractive index n, absorption) are similar. Use of third harmonic generation could facilitate preparation of a three-dimensional distribution map in a specimen and supply information impossible or hard to obtain with other microscopic techniques available today.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for determining the fine structure of materials by means of a nonlinear scanning laser microscope, comprising the steps of:

forming an image of a specimen by scanning selected points thereof with a focusable laser beam of a predetermined fundamental frequency w, thereby exciting said points to generate signals constituting the third harmonic 3w of said fundamental frequency w;

collecting said signals by collecting means;

substantially filtering out from said collected 3w signals, signals of a frequency other than said third harmonic 3w;

feeding said filtered 3w signals to a detector, and storing the output of said detector for processing and display.

2. The method as claimed in claim 1, wherein said scanning is effected by introducing a relative movement between said focusable beam and said specimen.

3. The method as claimed in claim 1, wherein said scanning is effected along a line and/or across a plane and/or throughout a volume of said specimen.

4. A nonlinear scanning laser microscope adapted to form an image of a specimen by scanning it point by point with a focusable laser beam of a predetermined fundamental frequency, thereby exciting said points to generate signals constituting a harmonic of said fundamental frequency, which signals are stored in storage means for purpose of processing and display, characterised in that said harmonic of said fundamental frequency is the third harmonic thereof.

5. The microscope as claimed in claim 4, wherein said beam is produced by a short-pulse laser.

6. The microscope as claimed in claim 5, wherein said short-pulse laser operates in the near infrared spectrum region, thereby placing said third harmonic in the visible or ultraviolet wavelength region.

7. The microscope as claimed in claim 4, further comprising means to introduce a relative movement between said focusable beam and said specimen.

8. The microscope as claimed in claim 5, wherein said short-pulse laser beam is produced by a CW mode-locked laser with pulses in the subpicosecond range.

* * * * *